(12) United States Patent
Avery (10) Patent No.: US 7,549,865 B2
(45) Date of Patent: Jun. 23, 2009

(54) MATHEMATICS MANIPULATIVE BOARD

(76) Inventor: Jean Avery, P.O. Box 419, Spring Lake, NJ (US) 07762

( * ) Notice: Subject to any disclaimer, the term of this patent is extended or adjusted under 35 U.S.C. 154(b) by 298 days.

(21) Appl. No.: 11/035,585

(22) Filed: Jan. 14, 2005

(65) Prior Publication Data

US 2006/0160052 A1 Jul. 20, 2006

(51) Int. Cl.
G09B 19/02 (2006.01)
(52) U.S. Cl. ................. 434/200; 434/191
(58) Field of Classification Search ........... 434/188, 434/190, 191, 193, 195, 207, 209, 210, 200, 434/201, 205, 208
See application file for complete search history.

(56) References Cited

U.S. PATENT DOCUMENTS

| | | | | |
|---|---|---|---|---|
| 793,676 | A * | 7/1905 | Olivera | 434/172 |
| 1,403,989 | A * | 1/1922 | Verneau | 434/208 |
| 2,472,439 | A * | 6/1949 | Rogers | 434/208 |
| 2,502,238 | A * | 3/1950 | Wade et al. | 434/208 |
| 2,514,636 | A * | 7/1950 | Glaze | 434/195 |
| 2,701,423 | A * | 2/1955 | Merrill | 434/345 |
| 2,714,261 | A * | 8/1955 | Hight | 434/199 |
| 2,971,275 | A * | 2/1961 | Provenzano | 434/191 |
| 3,002,295 | A * | 10/1961 | Armstrong | 434/195 |
| 3,224,114 | A * | 12/1965 | Swanson | 434/209 |
| 3,229,388 | A * | 1/1966 | Smith | 434/195 |
| 3,290,798 | A * | 12/1966 | Gilbert | 434/191 |
| 3,410,002 | A * | 11/1968 | Mulholland et al. | 434/195 |
| 3,586,333 | A * | 6/1971 | Abney | 273/242 |
| 3,667,760 | A * | 6/1972 | Nelson | 273/157 R |
| 3,935,649 | A * | 2/1976 | Harte | 434/195 |
| 4,106,216 | A * | 8/1978 | Boehm | 434/345 |
| 4,176,474 | A * | 12/1979 | O'Sullivan | 434/210 |
| 4,979,749 | A * | 12/1990 | Onanian | 273/282.1 |
| 5,120,226 | A * | 6/1992 | Tsai | 434/195 |

(Continued)

FOREIGN PATENT DOCUMENTS

GB 2066547 * 7/1981

OTHER PUBLICATIONS

Nienhuis Montessori, Multiplication Board Set, p. 64.

(Continued)

Primary Examiner—Kurt Fernstrom
(74) Attorney, Agent, or Firm—Hedman & Costigan, P.C.

(57) ABSTRACT

A mathematical manipulative comprising a board with at least one row of numbers having one or more first cooperating answer elements associated with the row of numbers and one or more answer markers having a second cooperating answer element for removable engagement and/or connection with at least one of the one or more first cooperating answer elements.

13 Claims, 5 Drawing Sheets

U.S. PATENT DOCUMENTS

| | | | |
|---|---|---|---|
| 5,219,289 A * | 6/1993 | Derr | 434/211 |
| 5,297,965 A * | 3/1994 | Manancero | 434/195 |
| 5,421,732 A * | 6/1995 | Taylor | 434/195 |
| 5,707,238 A * | 1/1998 | Bush | 434/190 |
| 5,738,524 A * | 4/1998 | Tsao | 434/210 |
| 5,971,269 A * | 10/1999 | Baguley | 235/68 |
| 6,077,079 A * | 6/2000 | Barnes | 434/128 |
| 6,089,871 A * | 7/2000 | Jaffe | 434/209 |
| 6,132,216 A * | 10/2000 | Muntean et al. | 434/191 |
| 6,513,708 B2 * | 2/2003 | Evans | 235/64 |
| 6,575,754 B2 * | 6/2003 | Salvo | 434/195 |
| 6,758,675 B2 * | 7/2004 | Karabaic | 434/189 |
| 7,040,898 B2 * | 5/2006 | Marcus et al. | 174/504 |
| 7,104,799 B1 * | 9/2006 | Sansing | 434/195 |
| 2002/0015936 A1 * | 2/2002 | Donn | 434/209 |

OTHER PUBLICATIONS

Nienhuis Montessori, Unit Division Board, p. 65.
Nienhuis Montessori, Addition Strip Board, p. 60.
Nienhuis Montessori, Subtraction Strip Boards, p. 62.

* cited by examiner

*FIG. 6*

MATHEMATICS MANIPULATIVE BOARD

FIELD OF THE INVENTION

The present invention relates to an educational manipulative for assisting in learning how to perform basic mathematic functions, including multiplication, division, addition and subtraction. More particularly, the invention relates to an educational manipulative board and markers that are removably retained on the board for teaching mathematic functions.

BACKGROUND OF THE INVENTION

The use of manipulatives has recently been a focus of student education because of the added sensory element to the learning process. It has been found that, by allowing students to include a "hands on" approach, manipulatives provide for learning at an accelerated pace, with greater retention.

These educational manipulatives have taken many forms. One such manipulative is a multiplication board with indents or cups that hold beads placed in each indent to designate the area below one component number being multiplied and to the right of the other component number being multiplied. The answer to the multiplication problem is, of course, the number of beads in the indents.

The multiplication board has a place marker for one component that merely lays on the flat surface of the board, subject to inadvertent movement. The other component is designated by inserting a written designation of the component into a slot, to be viewed by the student, without regard to the location of the component on a row of numbered rows on the board.

A division board is similarly known, where place markers are intended to reside in indentations below a row of numbers that act as the numerator. A student places markers equal in number to the numerator of a problem in the indentations, obscuring the numbers in the row of numbers from view by the student, and counts out beads equal to the denominator. The student places the beads into indents in the columns below the numerator markers and the number of rows they evenly fill is the answer, with remainders noted.

A manipulative is also known in the prior art for addition. In this device, the board is in the form of a matrix with numbers increasing in one direction rather than two, and a plurality of rows beneath the numbers sectioned into squares below the numbers. The student starts with a flat marker corresponding in length to the first component and places that below the row of numbers. The student then places another flat marker corresponding in length to the second component next to the first marker. The total is shown on the row of numbers at the top.

The prior art addition board includes a line running across the plurality of rows at the number ten so that combinations of components equaling ten can be arranged in the rows beneath the numbers.

Similarly, a subtraction manipulative board includes a matrix with a row of numbers and a plurality of rows beneath. The student uses a marker to block out the numbers in the row of numbers at the top to expose only up to the starting component. The student then takes a marker having a length corresponding to the number of the second component in the subtraction problem and places it below the row of numbers, with the training end starting at the marker blocking out the row of numbers. The answer is where the marker below the row of numbers ends.

However, students have some difficulty in placing and keeping the beads in the proper indents and the flat markers on the boards. The beads can fall out of the particular indents if the student placing additional beads into the indents or removing an improperly placed bead jars the board. The flat markers have a tendency to slide on the flat boards. Additionally, the prior art manipulative boards must be used on a steady flat surface or the beads will slip out of the indents.

Another deficiency of the prior art manipulatives is in the area of dealing with the problem that the student does not include a correspondence with the components of the problem being solved. Prior art devices seeking to ensure that the student is reminded of the component or components of the problem are deficient in using indicators merely placed near one of the components with the other reminder not being associated near the area corresponding to the component number.

As such, the indicators have the tendency to unintentionally move from the position of the component number desired to another number or to an area between numbers, so that the student does not have an accurate indication of the component number intended.

Additionally, the prior art manipulative boards do not include a space associated with the board for storing the beads or makers when not in use. As such, the beads or markers can become lost and unavailable to the student when needed.

Based on the prior mathematic manipulatives known, there is a need for an improved manipulative which is more user friendly, especially for younger students.

SUMMARY OF THE INVENTION

The present invention is directed to an educational mathematics manipulative comprising a board with at least one row of numbers having one or more first cooperating answer elements associated with the row of numbers and one or more answer markers having a second cooperating answer element for removable connection with the at least one of the one or more first cooperating answer element.

The manipulative board preferably further comprises place markers for marking one of the numbers in the row of numbers corresponding to one of the numerical components. When place markers are used, it is preferred that each of the numbers on the row of numbers have a corresponding first cooperating place element for connection with a second cooperating place element on a place marker.

The first and second cooperating elements of the answer or place markers can be of any suitable type, including friction fittings, snaps, magnets, hook and loop fasteners, clasps, or the like that can be removably connected to the cooperating element. In this regard, the first cooperating element can be formed of individual first cooperating elements or may be formed of a single first cooperating element that is common to all of the numbers in the row of numbers.

For example, in an embodiment using magnetic cooperating elements, the first cooperating element may be a dedicated magnet on the board which connects with a magnet on an answer marker. Alternatively, the first cooperating element may be a metal sheet across the area of the board that is common to more than one of the numbers on which magnets on the answer markers are connected. Another example would be VELCRO cooperating elements, where the first cooperating answer element is either a sheet of loop fastener or dedicated patches of loop fastener, the second cooperating answer element on the answer markers being the hook fastener portion.

Similarly, the place markers can be formed to associate with a plurality of numbers in a row. In such an embodiment, it is preferred that the answer markers be associated with a plurality of numbers in the row of numbers, i.e., answer markers being associated with 2, 3, 4, 5, etc. numbers in the row.

In another embodiment, the answer markers may have a different cooperating configuration than the place markers. In such an embodiment, the second cooperating place elements of the place markers need not be connectable to the first cooperating answer elements. Of course, the use of similar first and second cooperating place and answer elements, such as VELCRO, magnets, etc. may be used if desired.

In the preferred embodiment of the addition and subtraction boards, the boards have only a single row of numbers, without a plurality of rows associated therewith. The answer markers are preferably of lengths corresponding to at least one of the components of the addition or subtraction problem. In this embodiment, the first cooperating answer element is preferably a detent that corresponds to all of the numbers in the row of numbers and the second cooperating answer element is a corresponding channel that can slide along the detent, rather than forming a removable connection between the cooperating elements.

It is also contemplated that the board have electronic capabilities, with one or more sensors and an electronic display associated therewith. In a preferred embodiment, the component numbers having number markers associated with them will be sensed and displayed on the electronic display. Once the answer markers are properly placed, the electronic display will also show the correct answer.

Thus, in the example of four times four, the component numbers four and four may be marked with number markers sensed by sensors on the rows of numbers and displayed on an electronic display. Covering the answer elements associated with the four on one row and the four on the other row will be sensed and display the answer sixteen on the electronic display The device of the preferred embodiment also includes storage compartment operatively attached to the board, the storage compartment preferably comprising a cover and, if desired, having a plurality of first cooperating answer and/or place elements for storing the answer or place markers when not associated with the numbers in the row of numbers.

The board of the present invention may be made of any suitable material, with a washable plastic being most preferred. The shape of the board depends on the mathematic function being taught, with multiplication and division having a row of numbers associated along each of a horizontal and a vertical axis, the cooperating answer elements found therebetween. If addition or subtraction is being taught, the board may only have numerals along one axis, with first cooperating answer elements located either on the row of numbers or under the row of numbers.

BRIEF DESCRIPTION OF THE DRAWINGS

The drawings which are a part of the present application are intended to illustrate the present invention, without limiting the invention in any manner whatsoever, wherein.

DETAILED DESCRIPTION OF THE PREFERRED EMBODIMENT

As shown in FIGS. 1-3B, the present invention is directed to a manipulative comprising a board 2 with at least one row of numbers 4 having a first cooperating answer element 6 associated with the numbers in the row 4 and a plurality of answer markers 8 each having a second cooperating answer element 10 for connection with the first cooperating answer element 6.

Figure 1:
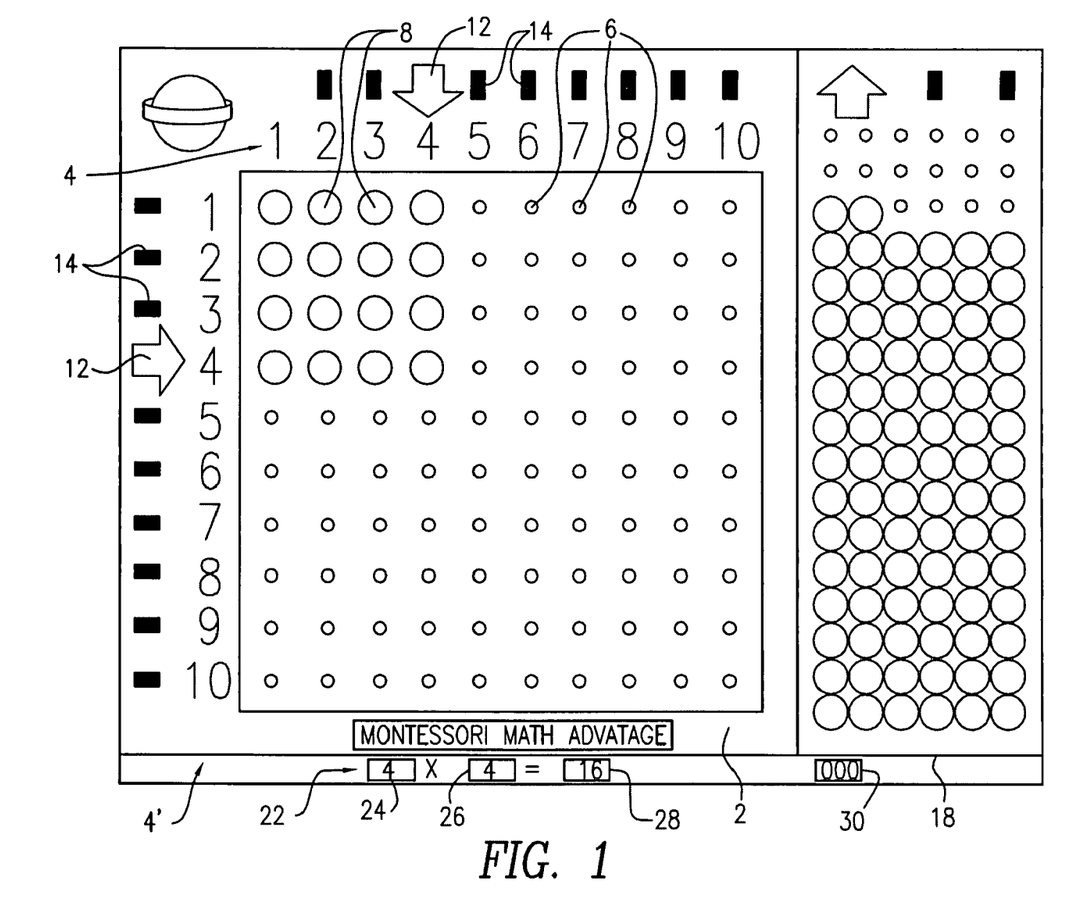
FIG. 1 is a perspective view of a multiplication board in accordance with a preferred embodiment of the present invention.
Figure 2A:
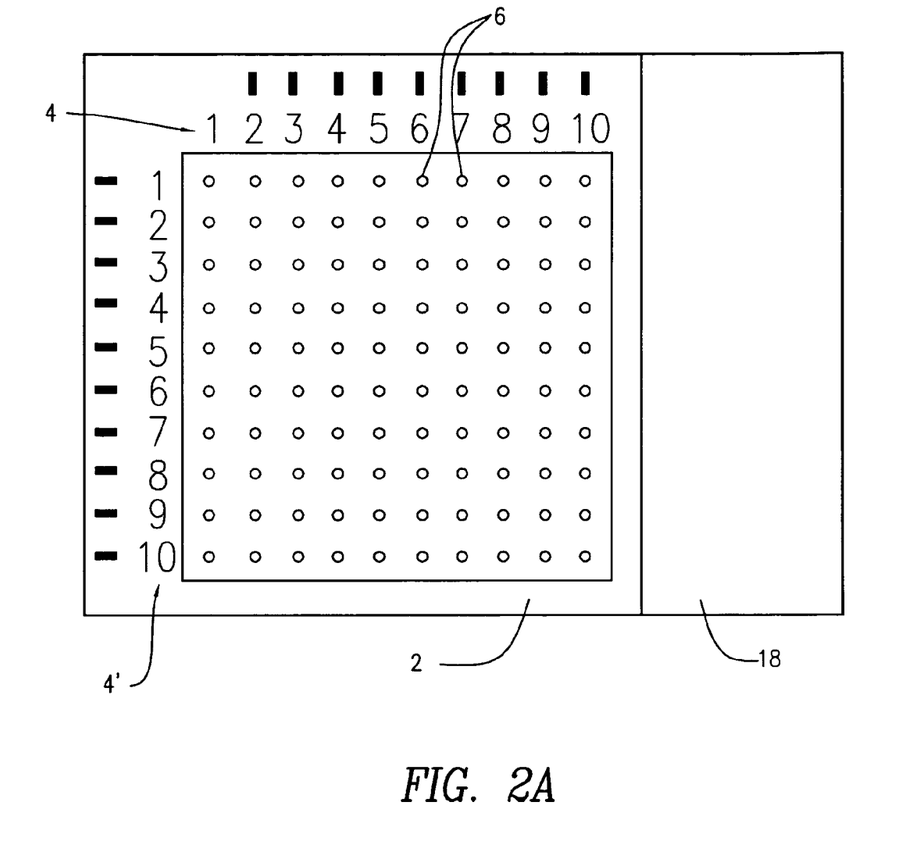
FIG. 2A is a schematic plan view of the multiplication board of FIG. 1.
Figure 2B:
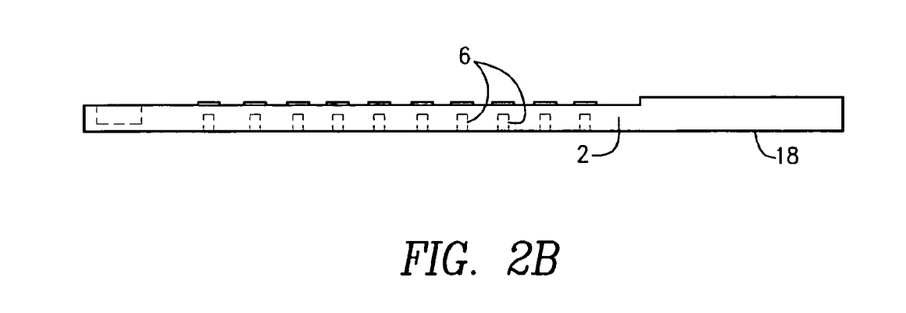
FIG. 2B is a schematic elevation view of the multiplication board of FIG. 1.
Figure 3A:
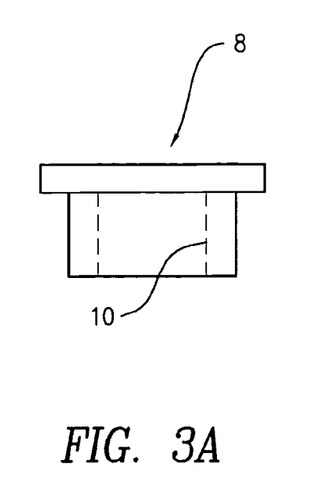
FIG. 3A is a schematic elevation view of an answer marker for use with the multiplication board of FIG. 1.
Figure 3B:
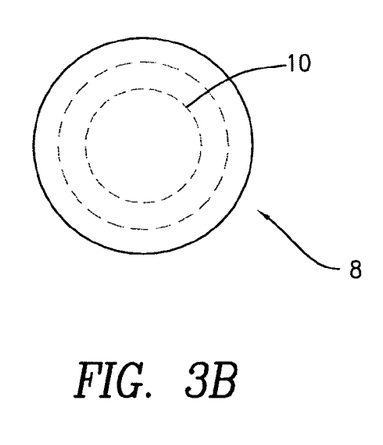
FIG. 3B is a schematic plan view of an answer marker for use with the multiplication board of FIG. 1.

In the preferred manipulative shown in FIGS. 1-3B, the first and second cooperating answer elements 6 and 10 of the board 2 and answer markers 8 are friction fit elements. As shown in FIG. 2B, the preferred first cooperating answer element 6 is shown in the form of a projection, detent or post extending upwardly from a surface of the board 2. The second cooperating answer element 10, located on the answer marker 8 shown in FIGS. 3A and 3B, is in the form of a receiver on the underside of the answer marker 8. Of course, the projection can be on the answer marker 8 with the receiver on the board 2 and still comprise the intended friction fittings.

The receiver, which is the second cooperating answer element 10, is of a dimension such that it forms a friction fit with the detent or post, which is the first cooperating answer element 6. As such, the first and second cooperating answer elements 6 and 10 form a friction fit removable connection between the answer marker 8 and the board 2.

Figure 4A:
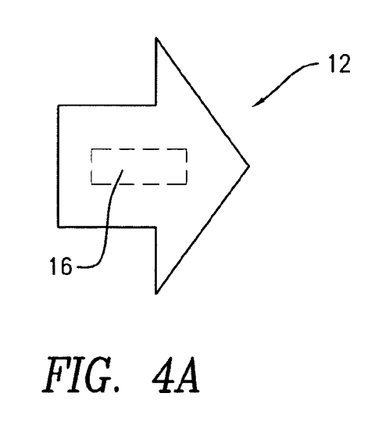
FIG. 4A is a schematic plan view of an answer marker for use with the multiplication board of FIG. 1.
Figure 4B:
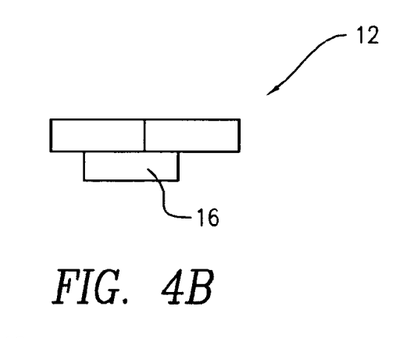
FIG. 4B is a schematic elevation view of an answer marker for use with the multiplication board of FIG. 1.
Figure 4C:
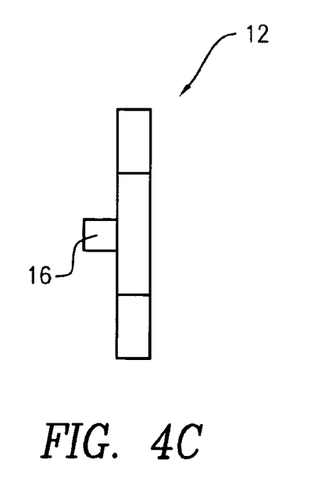
FIG. 4C is a schematic rear elevation view of an answer marker for use with the multiplication board of FIG. 1.

The board 2 preferably further comprises place markers 12, shown in FIGS. 1, 4A and 4B, for marking one of the numbers in the row of numbers 4 corresponding to one of the component numbers. When place markers 12 are used, it is preferred that each of the numbers on the row of numbers 4 have a corresponding first cooperating place element 14 for connection with a second cooperating place element 16 on the place marker 12. It is also preferred that the place markers 12 be located to the outside of the row of numbers 4, so that the markers do not obscure the student's view of the corresponding component number.

The first and second cooperating answer elements 6 and 10 of the answer markers 8, and the first and second cooperating place elements 14 and 16 of the place markers 12 when used, can be any suitable type which provide for removable connection of the markers 8 and 12 to the board 2. For example, the cooperating elements may be in the form of friction fittings (as shown in the Figures), snaps, magnets, channels, hook and loop fasteners, clasps, or the like.

In this regard, the first cooperating answer or place element 6 or 14 can be formed of individual first cooperating elements associated with individual numbers, as shown in FIGS. 1, 2A and 2B, or may be a common first cooperating answer and or place element 6 or 14 that is associated with a plurality or all of the numbers in the row of numbers (not shown).

Figure 5:
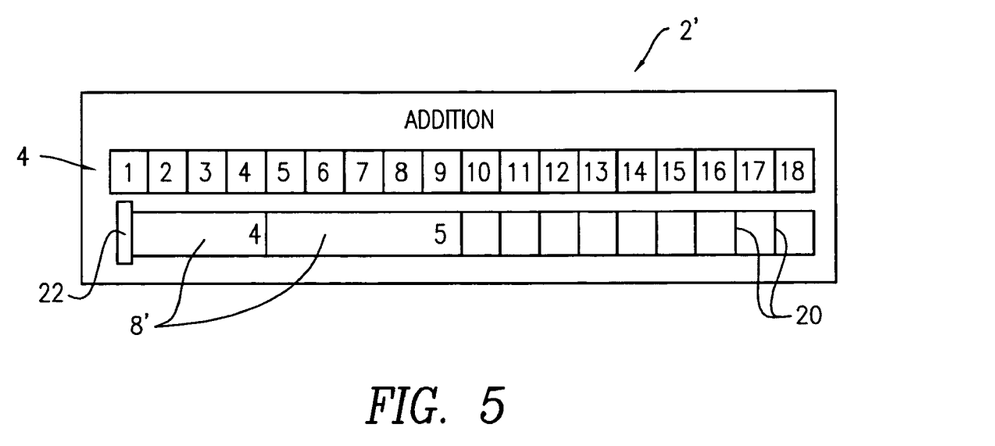
FIG. 5 is a schematic plan view of an addition board in accordance with a preferred embodiment of the present invention.
Figure 5A:
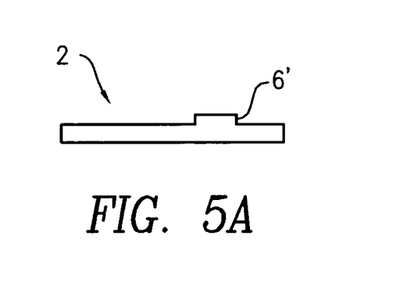
FIG. 5A is a side elevation of the addition board of FIG. 5.
Figure 5B:
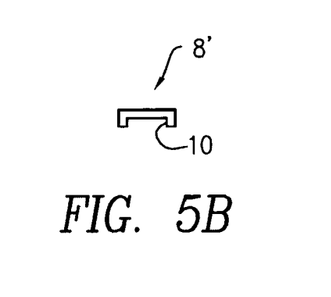
FIG. 5B is a side elevation of the answer marker for use with the embodiment of FIG. 5A.

A preferred embodiment of an addition board 2' is shown in FIGS. 5, 5A and 5B, with the number row 4 above a series of unit designations 20 corresponding to the numbers in the row 4. In the embodiment of FIG. 5 the answer markers 8' are shown as corresponding to a plurality of unit designations 20, rather than using an answer marker 8' for each associated number in the row 4. Of course, the addition board 2' can be used with individual answer markers 8' for each associated number, however, this is not considered to be a preferred embodiment.

As further shown in the preferred embodiment of FIG. 5, the addition board 2' includes a stop 22 at the end of the unit designations 20 corresponding to the beginning of the one unit. The stop 22 limits the travel of the answer marker 8' so that it uniformly begins at one unit. The stop 22 can be any suitable material, either formed integrally with the board 2' and/or the unit designations 20, or attached to one, the other or both during manufacture.

FIGS. 5A shows the first cooperating answer element 6' in the preferred addition board 2' is a detent. The detent of the first cooperating answer element 6' is engaged by a channel on the underside of the answer marker 8' that comprises the second cooperating answer element 10', shown in FIG. 5B. In this regard, it is a feature of the preferred embodiment that the answer marker 8' be raised in height not only to accommodate the second cooperating answer element 10' but also to make it more user friendly, allowing fingers to grasp the sides of the answer marker 10'.

In the example shown in FIG. 5, demonstrating the addition of four plus five, a first answer marker 8' corresponding in length to four units is placed adjacent the stop 22 and a second answer marker 8' corresponding in length to five units is place adjacent the first answer marker 8' to derive the answer nine on the row 4 of numbers.

Figure 6:
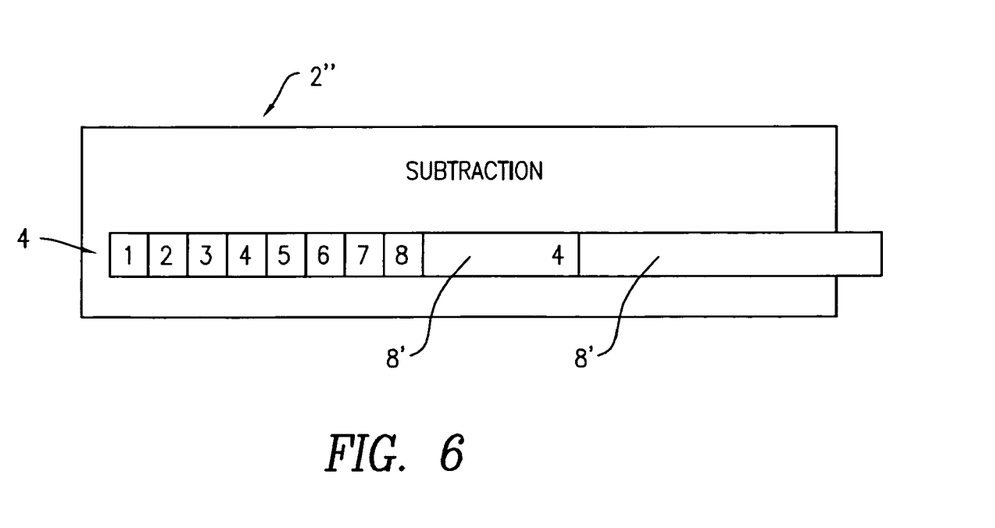
FIG. 6 is a schematic plan view of a subtraction board in accordance with a preferred embodiment of the present invention.

Similarly, FIG. 6 shows the preferred embodiment of a subtraction board 2" where a portion of the row of numbers 4 is covered by a first answer marker 8' to show only the number of the first component in the subtraction problem. Since the first answer marker 8' is used to cover the numbers not being used, back to the first component, it is preferably long enough to cover virtually the entire row of numbers 4. A second answer marker 8', preferably corresponding in length to the number of units of the second component in the subtraction problem, is placed on the row of numbers 4, adjacent to the first answer marker 8'.

For example, as shown in FIG. 6, twelve minus four would be shown on the subtraction board 2" with first answer markers 8' starting at twelve and the second answer marker 8' covering back to eight.

The cooperating first and second answer elements 6' and 10' used with the preferred subtraction board 2" are also the detent and channel arrangement described above with respect to the addition board 2' and shown in FIGS. 5A and 5B.

Other types of cooperating answer elements 6 and 10 can be used with the addition and subtraction boards 2' and 2", including friction fittings, snaps, magnets, hook and loop fasteners, clasps, etc. However, FIGS. 5A and 5B show a preferred first cooperating answer element 6' being a detent 6' common to a plurality of units under the row of numbers 4 and the second cooperating answer element 10' being a channel with the answer marker 8' corresponding in length to one of the components of the problem, that slides over the detent 6'.

Of course, even the detent 6' and channel 10' can be connected, if desired, such as by using a tongue and groove configuration between the detent 6' and the channel 10' with the channel 10' being slid onto the detent 6' from one side. However, in the addition and subtraction boards, the use of a detent 6' and channel 10' with answer markers 8' corresponding to the various component possibilities is believed to be sufficient to achieve the purposes set forth herein.

It is also contemplated that the board 2 of the present invention have electronic capabilities, as shown in FIG. 1, with one or more sensors and an electronic display 22 associated therewith. In a preferred embodiment, the component numbers having number markers 12 associated therewith will be sensed and displayed on the electronic display 22 on the component displays 24 and 26. Once the answer markers 8 are properly placed, the electronic display 22 will also show the correct answer in the answer display 28. This may also be accompanied by other stimulus, such as bells, buzzers, words, etc., that correspond to right or wrong answers.

Thus, in the example of four times four, the component numbers four and four may be marked with number markers sensed by sensors on the rows of numbers and displayed on the electronic display 22 in component displays 24 and 26. Covering the answer elements 6 associated with the four on one row 4 and the four on the other row 4' will be sensed and displayed as the answer sixteen on the answer display 28.

The board 2 of the preferred embodiment may also include a speaker 30 for providing an audio stimulus to the student using it. The speaker 30 may be adapted to recite a problem for the student to answer or may recite the components and/or answer to the problem being presented. Similarly, the speaker 30 may be adapted to provide a positive sounding chime or word like "correct" when the problem is correctly solved or a negative sounding buzz or words like "try again" when not correctly solved.

The board 2 of the preferred embodiment also includes a storage compartment 18 operatively connected to the board 2 for retaining the answer markers 8, as well as the place markers 12 if desired, when not associated with the component numbers in the row of numbers 4. The storage compartment 18 may be merely a walled area, as shown in FIGS. 2A and 2B, but would preferably have a cover to retain the markers 8 and/or 12. Alternatively, the storage compartment 18 can be removably attached to the board 2, or attached by a hinging type attachment. Additionally, the storage compartment 18 may include first cooperating elements 6 and/or 14 for connecting the answer and/or place markers 8 and/or 12 to the board 2 within the storage compartment 18, instead of or in addition to a cover.

The board 2 may be made of any suitable material, with a washable plastic or plastic coated metal for use with magnetic answer elements 8 being most preferred. The shape of the board 2 depends on the mathematic function being taught. When the function being taught is multiplication or division, there is a row of numbers 4 associated along a horizontal axis and another row of numbers 4' associated with a vertical axis, the first cooperating answer elements 6 being placed therewithin. If addition or subtraction is being taught, the board 2 may only have one row of numbers 4, along one axis, with the one or more first cooperating answer elements 6 corresponding thereto.

When the board 2 comprises two rows of numbers 4 and 4', i.e., for multiplication or division, one row 4 is aligned on a substantially horizontal axis and the other row 4' is aligned on a substantially vertical axis. In such an embodiment, as shown in FIGS. 1 and 2A, the first cooperating answer elements 8 are located in the area below the horizontal row of numbers 4 and to the right of the vertical row of numbers 4', aligned with the corresponding numbers.

Of course, persons skilled in the art may consider or become aware of variations, modifications, or deviations to the above description in light of this specification, including the claims and drawings. All such variations, modifications, deviations and the like are intended to be part of the present invention, limited only by the following claims.

I claim:

1. A mathematic manipulative comprising a board including two rows of numbers, one on a substantially horizontal axis and another on a substantially vertical axis having:
   a. one or more first cooperating answer elements associated with each number on each of the rows of numbers, each of the cooperating answer elements being the same,
   b. one or more answer markers having a second cooperating answer element for removable connection with any one of the one or more first cooperating answer elements, wherein the answer markers do not include any answer indicia associated with the answer markers, further wherein the second cooperating answer element of any answer marker cooperates with all of the first cooperating answer elements, and further wherein each answer marker is individual to one of the cooperating answer elements,
   c. a plurality of first cooperating place elements, at least one associated with each of the numbers in the rows of numbers,
   d. at least one place marker for each of the rows of numbers, each place marker having a second cooperating place element for connection with the first cooperating place element, and
   e. a storage section for holding the answer markers when not in use, said storage section comprising additional answer elements for removable connection with the second cooperating answer element of said answer markers.

2. The mathematic manipulative of claim 1 wherein the first cooperating answer element is individual to each number in the row of numbers.

3. The mathematic manipulative of claim 1 wherein one of the first and second cooperating answer elements comprises a projection and the other of the first and second cooperating answer elements comprises a receiver adapted to frictionally receive the projection.

4. The mathematic manipulative of claim 1 wherein the second cooperating answer element comprises a magnet.

5. The mathematic manipulative of claim 4 wherein the first cooperating answer element is a piece of metal for retaining a magnet common to two or more numbers in the row of numbers.

6. The mathematic manipulative of claim 4 wherein the first cooperating answer element is a piece of magnetic metal capable of retaining a magnet, said piece of magnetic metal being associated with only one number in the row of numbers.

7. The mathematic manipulative of claim 4 wherein the first cooperating answer element is a magnet.

8. The mathematic manipulative of claim 1 wherein the first cooperating answer elements are located in the area within below one of the two rows of numbers and to the right of the other of the two rows of numbers.

9. The mathematical manipulative of claim 1 further comprising an electronic display.

10. The mathematical manipulative of claim 9 wherein the electronic display displays an answer to a mathematical problem being solved.

11. The mathematical manipulative of claim 9 wherein the electronic display displays components of a problem being solved.

12. The mathematical manipulative of claim 9 wherein the electronic display displays components and an answer of a problem being solved.

13. The mathematical manipulative of claim 1 further comprising a speaker for providing an audio stimulus to a student.

* * * * *